US006753980B1

(12) United States Patent
Sakakura et al.

(10) Patent No.: US 6,753,980 B1
(45) Date of Patent: Jun. 22, 2004

(54) LINE-SWITCHING FACSIMILE MODEM APPARATUS AND A FACSIMILE MODEM CONNECTION METHOD

(75) Inventors: Takashi Sakakura, Tokyo (JP); Ryozo Kiyohara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 820 days.

(21) Appl. No.: 09/598,361

(22) Filed: Jun. 21, 2000

(30) Foreign Application Priority Data

Jul. 5, 1999 (JP) .......................................... 11-189830

(51) Int. Cl.[7] ................................................ H04N 1/00
(52) U.S. Cl. ...................... 358/440; 358/442; 358/400
(58) Field of Search .................. 358/400, 402, 358/442, 440, 434, 435, 436, 438, 439

(56) References Cited

U.S. PATENT DOCUMENTS

| | | | | | |
|---|---|---|---|---|---|
| 5,862,202 | A | * | 1/1999 | Bashoura et al. | 379/100.14 |
| 5,943,140 | A | * | 8/1999 | Monroe | 358/442 |
| 6,005,677 | A | * | 12/1999 | Suzuki | 358/442 |
| 6,052,445 | A | * | 4/2000 | Bashoura et al. | 379/100.14 |
| 6,310,942 | B1 | * | 10/2001 | Bashoura et al. | 379/100.14 |
| 6,381,313 | B1 | * | 4/2002 | Bashoura et al. | 379/100.14 |
| 6,437,871 | B1 | * | 8/2002 | Yuki | 358/1.15 |
| 6,545,768 | B1 | * | 4/2003 | Matsubara et al. | 358/1.15 |
| 6,590,677 | B1 | * | 7/2003 | Nakamura et al. | 358/442 |
| 6,603,569 | B1 | * | 8/2003 | Johnson, Jr. et al. | 358/1.15 |
| 6,639,974 | B2 | * | 10/2003 | Bashoura et al. | 379/100.14 |

FOREIGN PATENT DOCUMENTS

| | | |
|---|---|---|
| JP | HEi 1-181373 | 7/1989 |
| JP | A4259050 | 9/1992 |
| JP | HEI 10-257210 | 9/1998 |
| JP | HEI 11-164120 | 6/1999 |

* cited by examiner

Primary Examiner—Thomas D. Lee
(74) Attorney, Agent, or Firm—Birch, Stewart, Kolasch & Birch, LLP

(57) ABSTRACT

The facsimile modem of the present invention comprises a computer interface, a switching unit, and a memory unit. The objective of the present invention is this line-switching facsimile modem that can transmit a data demanding the security, high-speed, and low-cost delivery, by prioritizing the usage of the leased line in transmitting this data. The line-switching facsimile modem of the present invention is connected to a facsimile machine and has a function to transmit data via the public switched telephone network. When transmitting a facsimile data from the facsimile machine, the switching unit checks whether a leased line address is registered in the memory unit or not, and if the leased line address is found registered, the switching unit switches the connection from the public switched telephone network line to the leased line, and then the facsimile data is transmitted using the computer interface via the leased line.

14 Claims, 9 Drawing Sheets

702 — melco.fax.id=0467412172
703 — melco.fax.account=fadapter@sarah.ipt.isl.melco.co.jp
704 — melco.fax.passwd=fadapter1
705 — melco.fax.popsrv=10.74.4.177
706 — melco.fax.popprt=110
707 — melco.fax.smtpsrv=10.74.4.177
708 — melco.fax.smtpprt=25
709 — melco.fax.faxdev=/dev/ttyS0
710 — melco.fax.repintvl=86400000
711 — melco.fax.disckey=ldfldjhfgsljhjsfg
712 — melco.fax.secrkey=lsdjffoidflsidhlh
713 — melco.fax.adminadr=sakakura@isl.melco.co.jp

LINE-SWITCHING FACSIMILE MODEM APPARATUS AND A FACSIMILE MODEM CONNECTION METHOD

BACKGROUND OF THE INVENTION

1. Field of the Invention

The present invention relates to a modem apparatus for connecting to the facsimile machine, having the modulation and demodulation functions, and a facsimile modem connection method.

2. Background Art

A modem apparatus for the facsimile machine, which has the modulation and demodulation functions, had become widespread. Most of the modem apparatuses currently being sold in the markets nowadays are equipped with the modulation and demodulation functions, which are known as the "facsimile modem". These facsimile modems are provided with the followings: a serial port such as RS232C for connecting the facsimile modem to the computer; a telephone line connector for connecting the facsimile modem to the public switched telephone network (PSTN); and an another telephone line connector for connecting the facsimile machine and the telephone to the facsimile modem.

An interface for connecting the telephone to the public switched telephone network is generally being supplied in the facsimile modem. This interface is something that allows to use the telephone even when the power of the facsimile modem is off because the facsimile modem directly connects the telephone to the public switched telephone network. This way, the telephone can be used without having to unplug the facsimile modem and plug in the telephone line each time making a telephone call. This being the case, the computer cannot use the facsimile machine which is being connected to the facsimile modem by the previously mentioned telephone line connector.

The following techniques are some of the examples with configuration improved from the disadvantage by allowing the connection between the facsimile machine and the computer. The drawing of FIG. 9(A) is a configuration disclosed in the Japanese unexamined patent publication HEI 4-259050 which discloses a technique to utilize a facsimile machine as a printer of the computer by installing the linking mechanism and supplying the direct current power to the facsimile modem. As can be seen from the drawing, an adapter 807 is connected to a facsimile machine 805. By switching the switch inside the adapter 807 on, the facsimile machine 805 is connected to a modem 802' of the mobile personal computer 801. The personal computer 801 can use the facsimile machine 805 as an output device.

As another related art example, there is a facsimile machine which installs the facsimile modem which is connected to both the local area network (LAN) and the public switched telephone network. This facsimile machine can printout an input from the computer and can output an information received from the public switched telephone network. However, this technique is confined to the facsimile data transmission from a facsimile machine to another facsimile machine via the public switched telephone network only. That is, the connection is like those illustrated in the drawing of FIG. 9(B). In precise terms, the facsimile machine 101 transmits facsimile data to its destination which is the facsimile machine 101' via the public switched telephone network 102.

According to the facsimile modem of the conventional example disclosed in the Japanese unexamined patent publication HEI 4-259050, a pseudonymous switching function is added to the facsimile modem to utilize the facsimile machine as a printer of the personal computer. The problem with this configuration is a lack in a function of selecting the line other than the public switched telephone network line in transmitting the facsimile data. For the facsimile machine installing the facsimile modem, likewise, the facsimile machine itself and the facsimile modem installed at the connection described in FIG. 9(B) has a similar problem.

According to one of the aim of the present invention, not only it attempts to solve the problem mentioned above but it also aims to achieve the facsimile modem that can selectively transmit the facsimile data in which the security, high-speed, and low-cost delivery are in demand, by selecting and using the fixed lines such as leased line, local area network, and internet. The facsimile modem of the present invention is used by connecting the facsimile machine to the public switched telephone network. The facsimile modem of the present invention also has an interface for connecting the computer to the modem.

SUMMARY OF THE INVENTION

According to one aspect of the present invention, a line-switching facsimile modem having a function of transmitting and receiving a facsimile data through a facsimile connect line and a public switched telephone network connect line comprises a computer interface connected to an inner data bus; a storage for registering an address; a control program stored in the storage; and a switching unit for performing a switching operation between the public switched telephone network connect line and the computer interface controlled by the control program. The control program checks an address registration in the storage when the facsimile machine requests for a facsimile data transmission. The switching unit connects to the computer interface in case that the address is already registered.

According to another aspect of the present invention, the line-switching facsimile modem includes the control program which controls to transmit its address after the facsimile data transmission via the public switched telephone network.

According to another aspect of the present invention, the line-switching facsimile modem includes the control program which controls to transfer an address received to the computer interface after the facsimile data transmission and reception via the public switched telephone network.

According to another aspect of the present invention, a facsimile modem connection method for transmitting and receiving a facsimile data from a facsimile machine comprises: a computer interface connected to an inner data bus; a storage for registering an address; a control program stored in the storage; and a switching unit for performing a switching operation between the public switched telephone network connect line and the computer interface controlled by the control program; checking whether an address is registered in the storage when the facsimile machine requests for the facsimile data transmission; and transmitting the facsimile data via the computer interface in case that the address is already registered.

According to another aspect of the present invention, the facsimile modem further comprises a step of transmitting its address via the public switched telephone network in case that the address is lacking.

According to another aspect of the present invention, the facsimile modem further comprises the steps of receiving an address received via public switched telephone network in case that the address is lacking; and transferring the address received to the computer interface connected to the inner data bus.

According to another aspect of the present invention, the facsimile modem further comprises a step of registering the address received to the storage, in case that a registration is instructed by a host computer.

According to another aspect of the present invention, the facsimile modem further comprises the step of checking whether an instruction is being made from a host computer to transmit the facsimile data via the computer interface; and transmitting the facsimile data via the public switched telephone network, in case the instruction is lacking.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 7 illustrates an example of the whole information managed by the host computer of FIG. 6;

DETAILED DESCRIPTION OF THE PREFERRED EMBODIMENTS

Figure 1:
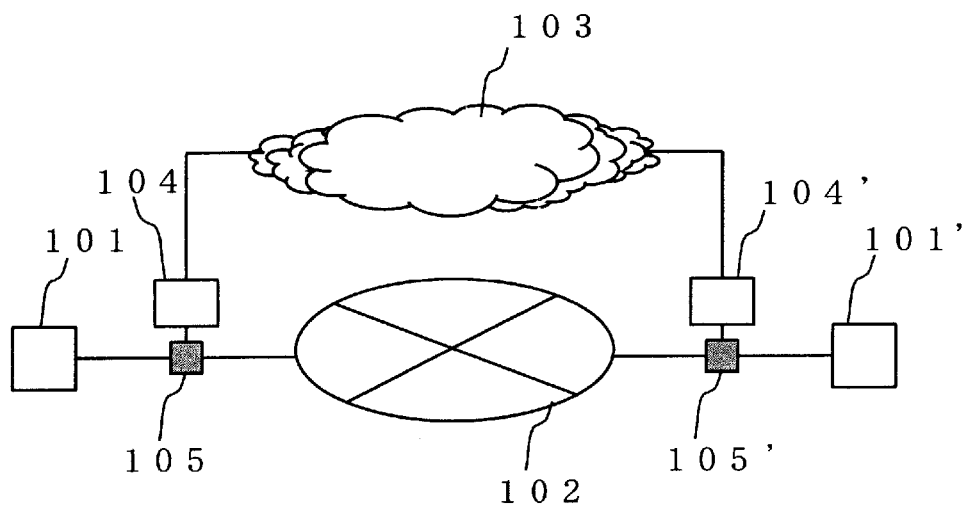
FIG. 1 is an outline of system configuration using the facsimile machine for the present invention.

Reference will now be made in detail to the present preferred embodiments of the invention, examples of which are illustrated in the accompanying drawings, wherein like reference numerals indicate like elements throughout the several views.

Embodiment 1

The embodiment 1 describes a facsimile modem of the present invention and a facsimile system of the present invention constructed using the line-swtiching facsimile modems as the components of the facsimile system.

The drawing of FIG. 1 outlines the system configuration. As can be seen in this drawing, the two components are mutually being connected via the two lines, namely; a public switched telephone network 102 and a leased line 103. A facsimile machine 101 is connected to the public switched telephone network 102 via a facsimile modem 105 which is one embodiment of the present invention. The facsimile modem 105 is further connected to and controlled by a host computer 104 which is connected to the local area network or the leased line 103. In FIG. 1, this leased line 103 is the internet. Hereinbelow, a configuration and an operation of the line-switching facsimile modem of the present embodiment are separately described.

Figure 2:
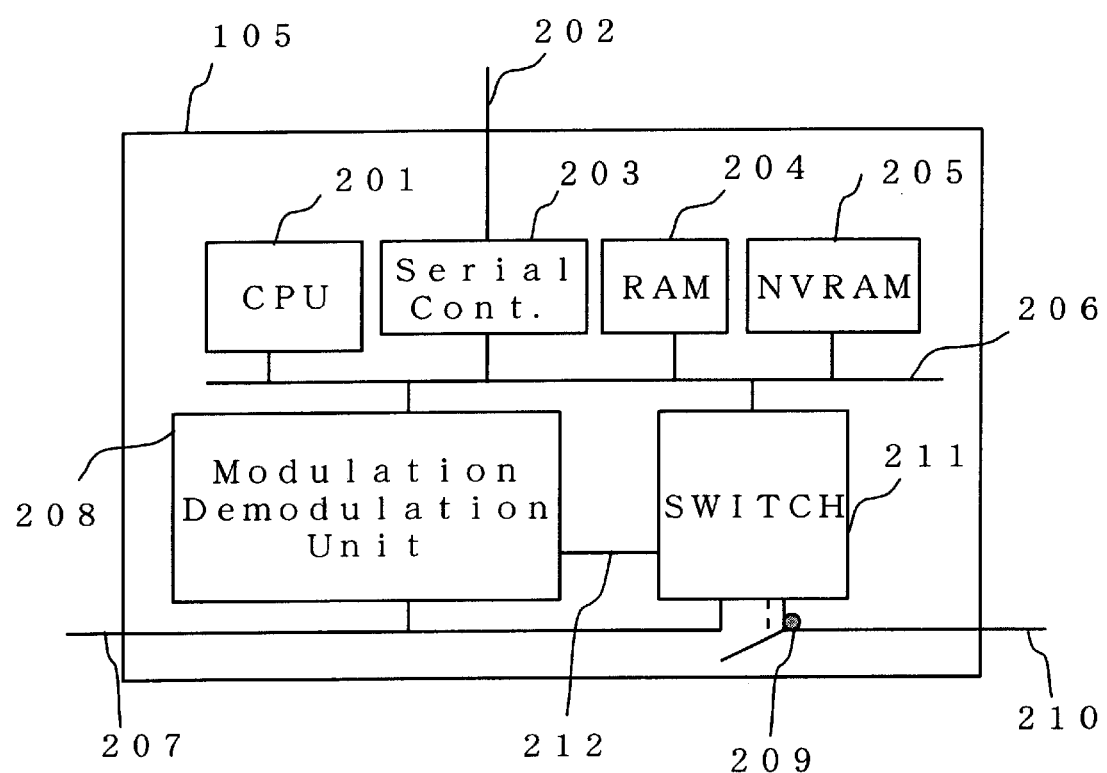
FIG. 2 illustrates a configuration of the facsimile modem of the embodiment 1 of the present invention.

The configuration of the facsimile modem 105 of the present embodiment is described with reference to the drawing of FIG. 2. In this drawing, the reference numeral 207 denotes the twisted pair line for connecting to the public switched telephone network (hereafter referred to as public switched telephone network connect line 207), and the reference numeral 210 denotes the twisted pair line for connecting to the facsimile machine (hereafter referred to as facsimile connect line 210).

When the power of the facsimile modem 105 is off, a relay 209 is closed so the public switched telephone network connect line 207 and the facsimile connect line 210 are directly connected. In other words, the facsimile machine 101 become connected only to the public switched telephone network as usual. A modulation and demodulation unit 208 and a switching unit 211 (switch) are connected to the public switched telephone network connect line 207. The switching unit 211 is also connected to the facsimile connect line 210 so that the switching unit 211 can perform connection control (switching operation) between the lines 207 and 210. The modulation and demodulation unit 208 and the switching unit 211 are independently connected to the public switched telephone network connect line 207, and performs control with one another via a control line 212.

The reference numeral 206 is an inner data bus. The followings are connected to the inner data bus 206: a central processing unit (CPU) 201 for controlling all of the units inside the facsimile modem 105; an RS232C serial controller 203 which is an input/output interface with the host computer 104 (hereafter referred to as computer interface 203); a memory unit (RAM) 204; a non-volatile memory (NVRAM) 205; and the modulation and demodulation unit 208 and the switching unit 211. An RS232C cable 202 (hereafter referred to as computer side interface 202) connects the facsimile modem to the host computer 104.

According to the system configuration outlined in FIG. 1, the facsimile modem 105 and the host computer 104 are connected as separate entities, however, the facsimile modem 105 and the host computer 104 can be united as one entity. The host computer 104, for example, is a personal computer.

Figure 3:
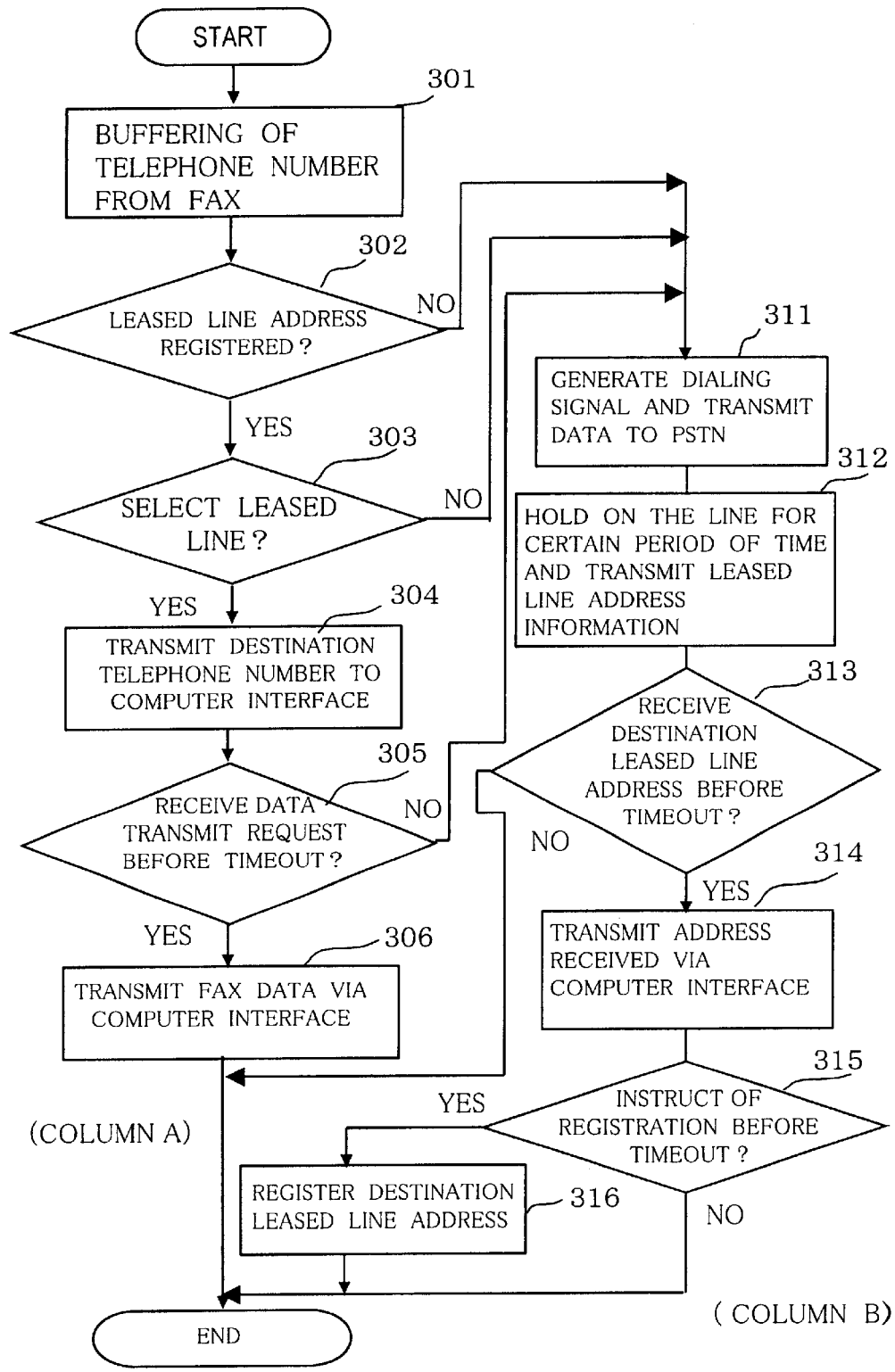
FIG. 3 illustrates an operational flow of the facsimile modem of the embodiment 1 of the present invention.

The drawing of FIG. 3 illustrates a flow of the operation of the facsimile modem 105. Based on each procedural step of FIG. 3 stored in the non-volatile memory 205, the central processing unit 201 operates in the order given. In this drawing, the left column (column A) mainly indicates a use of the leased line 103, the right column (column B) indicates a use of the public switched telephone network line 102, and step 313 onwards are a receiving operation.

The facsimile modem 105 has the characteristics in its transmitting operation. Considering the security, speed and cost of the communication, the data of the facsimile machine 101 is better of transmitted by using the leased line 103 rather than the public switched telephone network line 102. However, which line to use is something that is managed by the manager and it is not something that a general user of the facsimile machine 101 is aware of. To begin with, the user of the facsimile machine 101 transmits a facsimile data to the facsimile machine 101' using the telephone number 01113122082121.

Figure 4:
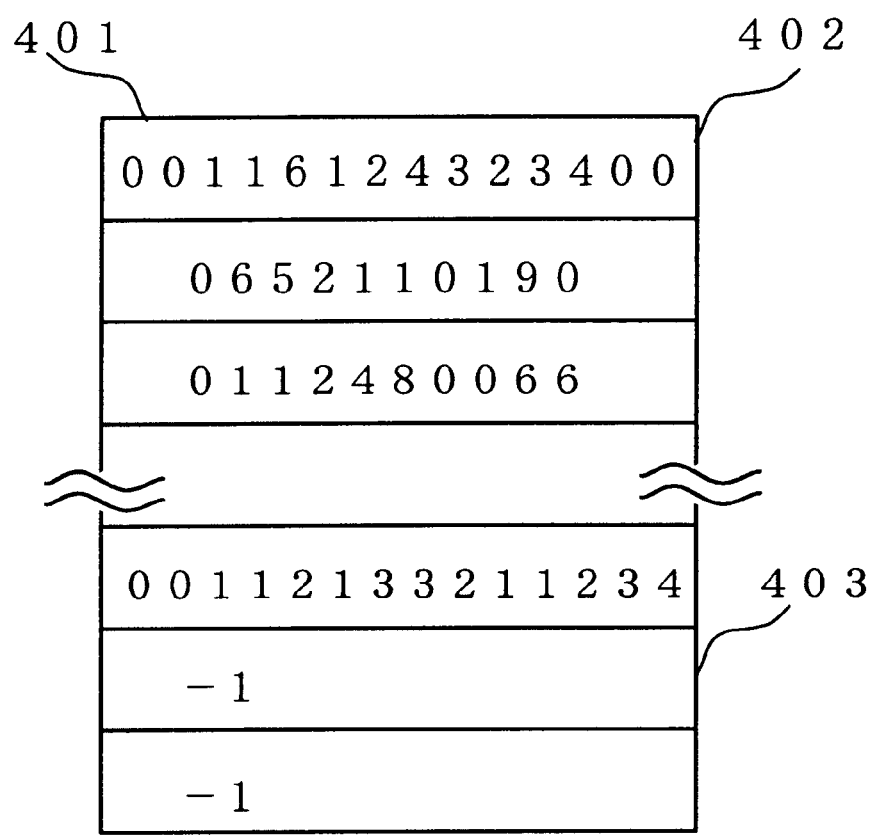
FIG. 4 illustrates a data example of telephone number registration table inside the non-volatile memory 205 of FIG. 2.

In step 301 of FIG. 3, the switching unit (switch) 211 inside the facsimile modem 105 receives a dialing signal, and checks whether or not this telephone number is registered in the non-volatile memory 205 by referring to the telephone number registration table 401 indicated in the drawing of FIG. 4. The reference numeral 401 of FIG. 4 denotes the whole table. The reference numeral 402 denotes the example of registered telephone number. The reference numeral 403 denotes the example of unregistered entry. In the case of FIG. 4, since the telephone number of the destination facsimile machine 101' is found unregistered, a dialing signal is generated at step 311 based on the telephone number temporarily registered in the memory unit 204, and with the turn of the switch 211 on, the public switched telephone network connect line 207 and the facsimile connect line 210 of the facsimile modem 105 are connected. When the destination facsimile machine 101' is off hooked, the facsimile machine 101 can commence the facsimile data transmission.

When the facsimile data transmission including the five phases finishes, the facsimile machine 101 off hooks and disconnects the line.

Figure 5:
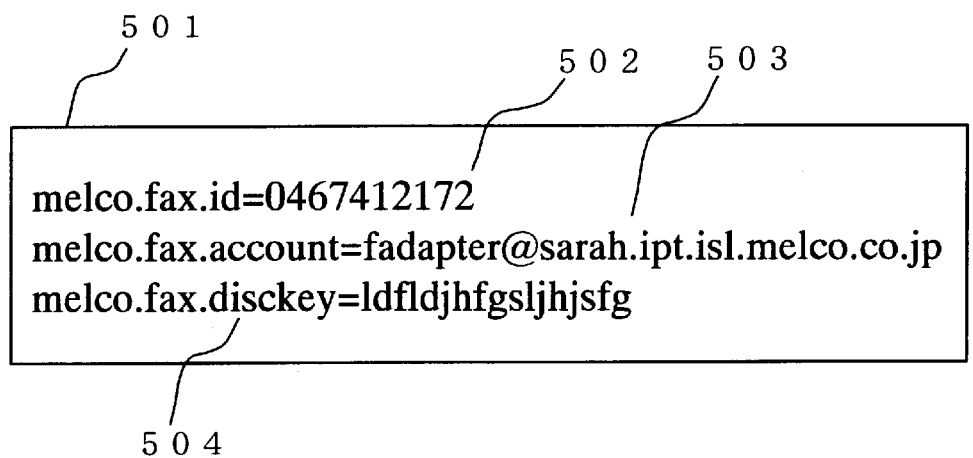
FIG. 5 illustrates a data example of leased line address information inside the non-volatile memory 205 of FIG. 2.

The transmitting operation afterwards is also unique. That is, in step 312, the switching unit 211 detects that the facsimile machine 101 is disconnected and while still holding onto the public switched telephone network line 102 transmits a command to the modulation and demodulation unit 208, the command of which instructs to send an additional information, via the control line 212. The modulation and demodulation unit 208 transmits a leased line address information 501 of FIG. 5 which is already registered on the non-volatile memory 205 by the host computer 104 via the computer interface 203. Contents of the leased line address information 501 is arbitrary. For example, the leased line address information 501 includes: a telephone number 502 in the public switched telephone network registered by the host computer 104; a mail address 503 provided by the present facsimile modem 105; and a public encryption key 504.

The transmitting operation of the facsimile data via the public switched telephone network line 102 for the unregistered case is so far described.

Now, the receiving operation via the public switched telephone network line 102, which carries on from the transmitting operation is also unique.

The destination facsimile machine 101' finishes receiving the facsimile data and off hooks, then in step 313, the facsimile modem 105 holds on the public switched telephone network line 102 until timeout. In the step 313, if the leased line address information 501 of the facsimile machine 101' is transmitted from the facsimile modem 105, then that address is temporarily registered at, for example, the memory unit 204, and the central processing unit 201 is notified by interrupt. In step 314, the central processing unit 201 notifies to the host computer 104 via the computer interface 203. The host computer 104 receives this notification, issues an expansion AT command "AT+FYY", and obtains the leased line address information 501 of the facsimile machine 101'. Further, the host computer 104 registers the destination leased line telephone number of the facsimile machine 101' to the facsimile modem 105 by using the "AT+FT" command. That is, in step 315, when the facsimile modem 105 receives the "AT+FT" command data from the host computer 104, then in step 316, the central processing unit 201 registers the data related to the leased line address information of the facsimile machine 101' included in the "AT+FT" command to the registration entry 401 of the memory unit 205.

The disconnect command is issued to the switching unit 211 inside the facsimile modem 105, and then the switching unit 211 disconnects the public switched telephone network line 102.

Followed by the transmitting operation, the receiving operation finishes as described per above. The transmitting operation and the receiving operation of the column B of FIG. 3 via the public switched telephone network line 102 are complete. The registration which prioritizes the connection via the leased line 103 over the public switched telephone network line 102 from the next time onwards is also completed at the same time.

Next, the operation for transmitting the facsimile data of the facsimile machine 101 via a network, the network in which the host computer 104 belongs to is described (see column A of FIG. 3). The leased line 103 is the internet in this example.

The user utilizes the facsimile machine 101 in a similar manner as the case of transmitting the facsimile data from the facsimile machine 101 to the facsimile machine 101' via the public switched telephone network line 102. Following the procedure indicated in FIG. 3, the facsimile modem 105 switches the connection from the public switched telephone network line 102 to the leased line 103.

Figure 6:
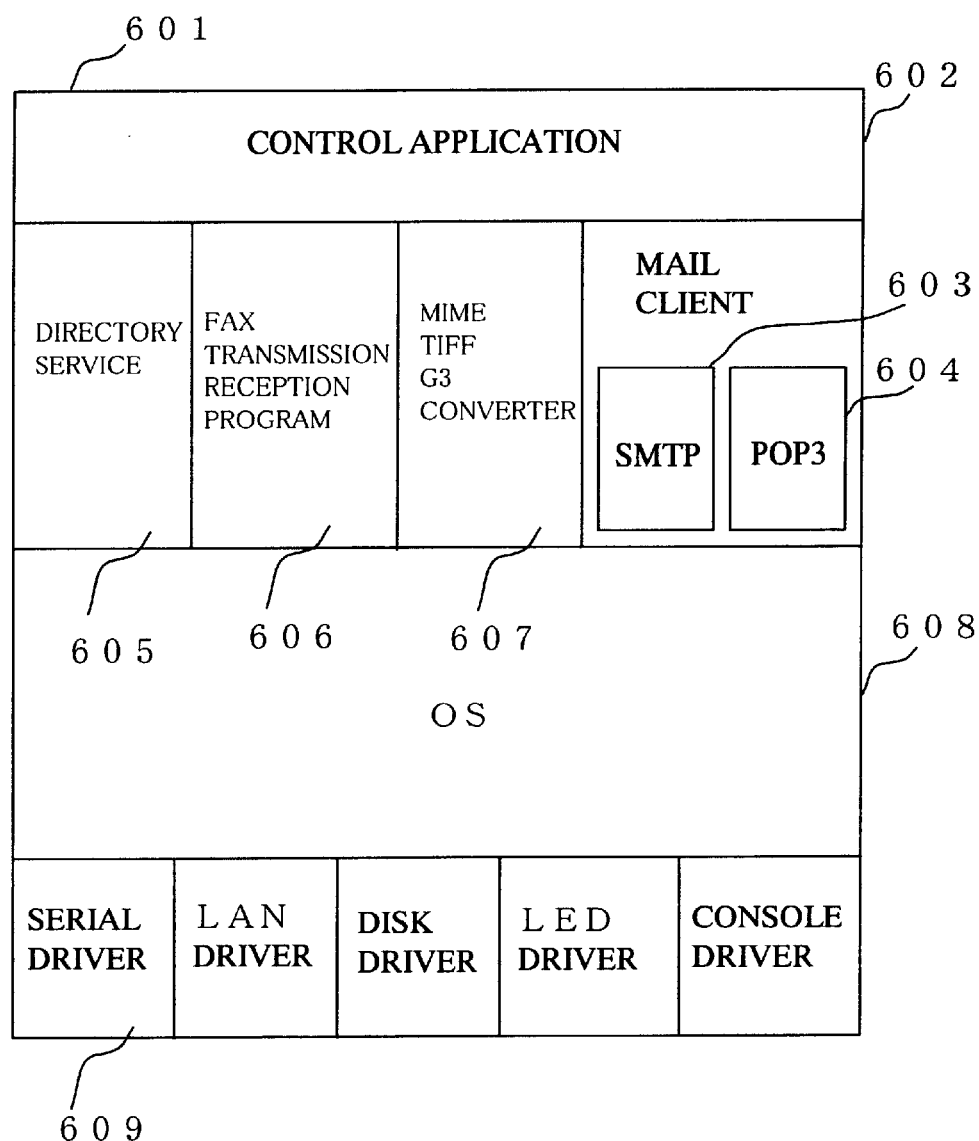
FIG. 6 illustrates a software configuration of the host computer 104 of the embodiment 1.

The configuration of the host computer 104 is firstly described. The host computer 104 which operates together with the facsimile modem 105 installs a software in which its configuration is illustrated in the drawing of FIG. 6. In this drawing, the reference numeral 601 indicates a whole of the software, the reference numeral 602 denotes a control program for controlling the facsimile data transmission, the reference numeral 603 denotes a mail transmitting program for transmitting the facsimile data as an electronic mail, and the reference numeral 604 denotes a mail receiving program. The reference numeral 605 denotes a database which manages the leased line address information 501 which notifies to the facsimile modem. The reference numeral 606 denotes a program for carrying out data transmission and reception to the facsimile modem and controlling the facsimile modem via the serial interface. The reference numeral 607 denotes a program for carrying out data conversion from the facsimile data into the electronic mail format data, and vice versa. This software operates on the operating system (OS) 608. A serial driver 609 which controls the serial controller connected to the facsimile modem and all other device drivers are installed below the operating system 608.

The host computer 104 manages the information 701 of FIG. 7, which is an information about itself. The description of reference numerals indicated in the drawing of FIG. 7 follows: a telephone number 702; a mail account address 703 for taking in the facsimile data mail; a password 704 for connecting to the mail server on the internet for receiving the mail; a received mail server address 705; a port number 706; a transmission mail server address 707 for transmitting the facsimile data mail; a port number 708; the serial port device name 709 which is connected by the facsimile modem; an interval for reporting the facsimile data transmission status 710; a public key 711 for encrypting and decrypting upon the facsimile data and the electronic mail format data conversion; the private key 712; and a mail address 713 of a manager periodically reporting the incident occurrences and reporting the facsimile data transmission and reception status 713.

Now, as one embodiment of the present invention, a local area network connected to the internet can be used as a leased line. In this embodiment, how the host computers 104 and 104' transmit and receive the facsimile data by using the local area network connected to the internet as the leased line 103 is described.

The user of the facsimile machine 101 transmits the facsimile data to the destination facsimile machine 101'. When the telephone number 01113122082121 is dialed, since this telephone number is registered in the registration entry 401 of the memory unit 205 of the facsimile modem 105 as already described, therefore in step 302, the switching unit 211 interrupts the central processing unit 201. In step 304, this is accepted, and the central processing unit 201 transmits an event and "FRING 01113122082121" to the host computer 104 via the computer interface 203. Note that the host computer 104 can be set to inquire whether to prioritize the connection via the leased line 103 or not in step 303. In this case, the connection via the leased line 103 is prioritized.

The host computer 104 in read waiting status issues an "ATA" command when the facsimile data transmission and reception program 606 receives the event.

In step 305, the central processing unit 201 receives the "ATA" command. Then, the central processing unit 201 instructs the switching unit 211 to connect the line to the computer side interface 202. The switching unit 211 issues a command to output data to the memory unit 204 via the inner data bus, and connects the facsimile connect line 210 to the modulation and demodulation unit 208. The switching unit 211 transmits the data to a circular buffer on the memory unit 204. When the circular buffer is filled up with the data, the switching unit 211 interrupts the central processing unit 201. In step 306, the central processing unit 201 transmits the data to the host computer 104 via the computer interface 203. When the central processing unit 201 finishes the transmission of this data, then it requests for the next chunk of data to the modulation and demodulation unit 208.

The transmitting operation of the facsimile data of the facsimile machine 101 by the facsimile modem 105 and the host computer 104 via the leased line 103 is so far described.

At step 305, if there is no more data transmission instruction to the host computer 104 via the computer interface 203, then go to step 311 and connect to the public switched telephone network, and then the operation onwards is as described before.

The registration of the leased line address information may also be applied to the case of receiving operation of the facsimile data as well.

Figure 8:
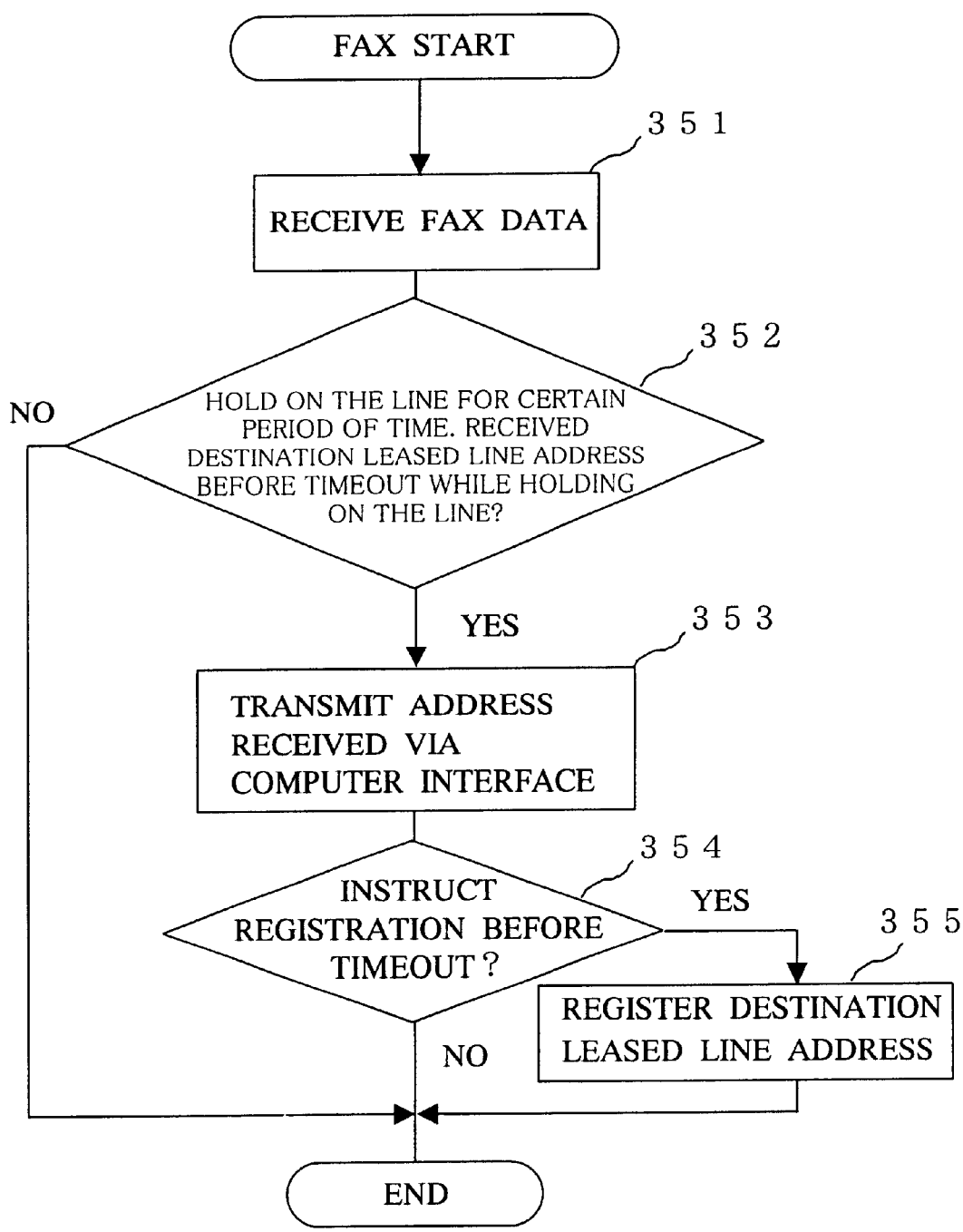
FIG. 8 illustrates a receiving operational flow of the facsimile modem of the embodiment 1.
Figure 9:
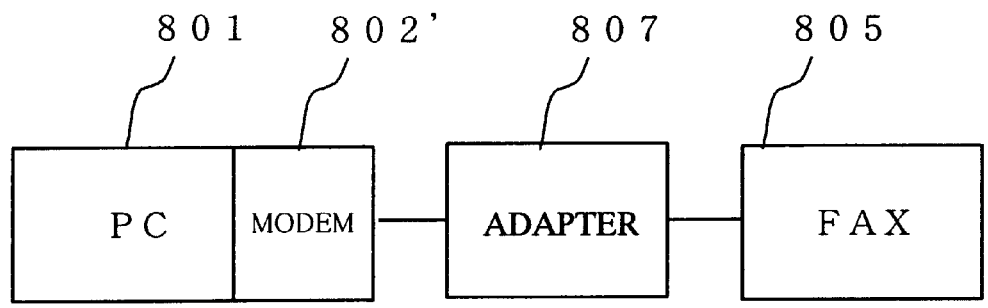
FIG. 9 illustrates a configuration for the connection of the conventional facsimile machine and other devices.
Figure 9:
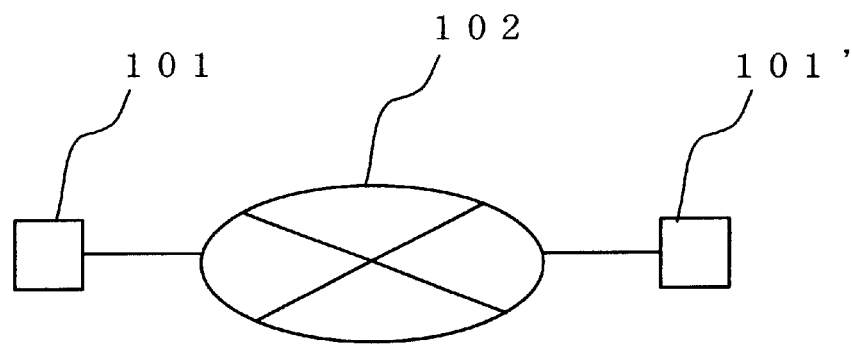

The drawing of FIG. 8 illustrates the flow of receiving the facsimile data.

According to this drawing, the facsimile data of the facsimile machine 101 is received in step 351. Even after the facsimile data is received, the leased line 103 is held on for some period of time in step 352. Then, wait until the leased line address information of the facsimile modem 105 is received. If this address is received before the timeout, then in step 353 this address is transmitted to the host computer 104. In step 355, this address is registered if instructed as so by the host computer 104. The registered address is used for the next data transmission via the leased line 103.

This flow of FIG. 8 for receiving the facsimile data assumes the reception via the public switched telephone network line 102, however, in the case of reception via the leased line 103, then of course the processes beyond step 352 are unnecessary. The receiving operation for the latter case finishes immediately after completing the facsimile data reception of step 351.

Operation of how the host computer 104 transmits the data to the host computer 104' is described next in detail.

The host computer 104 finishes receiving the facsimile data from the facsimile modem 105. Then, the host computer 104 transmits a hang up command to the facsimile modem 105. The central processing unit 201 receives the hang up command, and requests the switching unit 211 to disconnect the line.

Meanwhile, the host computer 104 which has received the facsimile data hands over the received facsimile data to a control application 602. The control application 602 searches the database 605 by using the previously received telephone number, and obtains the destination mail address and an encryption public key.

The control application 602 uses the encryption public key obtained from the database 605 to encrypt the facsimile data by using the convert program 607, and further convert the encrypted facsimile data into the ascii data making it mail transmission possible, that is, the encrypted facsimile data is converted into the mail data format. By using the mail transmitting program 603, the address 707 of mail transmitting server on the internet and the port 708 are specified, and register the mail which is obtained by the facsimile data conversion into the database 605, and the mail is transmitted to the destination mail address.

The receiving operation of the facsimile data mail at the destination facsimile machine 101' is described next.

The mail receiving program 604 of the destination host computer 104' obtains from the control application 602 the mail address 703 of the facsimile modem 101', the password 704, the received mail server address 705 on the internet, and the port 706, and watches for arrival of the mails every minutes. When the mail receiving program 604 of the destination host computer 104' receives the facsimile data mail transmitted by the host computer 104, the control application 602 is notified. The control application 602 converts the received facsimile data mail into the facsimile data by using the convert program 607. Then, extract a portion of the facsimile data and convert that portion from the ascii into binary data, and decrypt the binary data using the encryption private key 712 which is provided by the control application 602.

The control application 602 obtains the facsimile data, and then requests for an output of the facsimile data to the transmission reception program 606. The transmission and reception program 606 issues the "ATDL" command to the facsimile modem 105.

The central processing unit 201 receives the "ATDL" command via the computer interface 203, secures the circular buffer on the memory unit 204, and requests to the switching unit 211 for a connection from the host computer 104' to the facsimile connect line 210. The switching unit 211 issues the dialing signal and wait for the facsimile machine 101' to off hook. When the facsimile machine 101' is off hooked, the switching unit 211 instructs the modulation and demodulation unit 208 to transmit the facsimile data in the memory unit 204.

The modulation and demodulation unit 208 commences negotiation with the facsimile machine 101' based on the facsimile protocol. At the phase C of the facsimile protocol, which is the message transmission phase, the central processing unit 201 is interrupt for data transmission request. The central processing unit 201 transmits the data transmission request to the host computer 104' via the computer interface 203. When the serial controller 203 receives the data from the host computer 104', the central processing unit 201 copies the data on the circular buffer secured on the memory unit 204, and when the circular buffer became full of the data, the modulation and demodulation unit 208 is notified as so together with the buffer address. The modulation and demodulation unit 208 receives the data from the memory unit 204, and after modulating of the data, the modulated data is transmitted to the facsimile machine 101'.

The modulation and demodulation unit 208 finishes the data transmission inside the circular buffer of the memory unit 204, requests for subsequent data by interrupting the central processing unit 201, and keeps on requesting until the data transmission are all complete.

The control application 602 searches the database 605 by holding the transmission mail address, and finishes the facsimile data transmission of a record of which its state is indicated as "facsimile data transmission in progress" by setting the record as "facsimile data transmission complete". The facsimile data reception is completes accordingly.

Also, the host computer 104 transmitting the data to the host computer 104' can be set to have a communication management.

For example, the host computer 104 routinely reports the facsimile data transmission status, in other words, reports the status of the facsimile data which are transmitted via the internet 103. The control application 602 creates the transmission status report by receiving a report that the host computer 104 has attained the facsimile transmission status report interval 710 of FIG. 7 by a timer, by searching all records of the database 605, and by collating together those records of the data with status indicating "facsimile data transmission complete" or "facsimile data transmission in progress". After transmitting the transmission status report to the manager address 713, those records indicating "facsimile data transmission complete" are initialized.

Instead of using the public switched telephone network in transmitting a facsimile data from one facsimile machine to another facsimile machine, a line-switching facsimile modem of the present invention prioritizes and uses the leased line and the internet in transmitting the facsimile data, to bring about the effects of high-speed delivery of the facsimile data and reducing the cost of the communication.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A line-switching facsimile modem having a function of transmitting and receiving a facsimile data through a facsimile connect line and a public switched telephone network connect line, comprising:

a computer interface;

a storage for registering an address;

a control program stored in the storage; and a switching unit for performing a switching operation between the public switched telephone network connect line and the computer interface controlled by the control program;

wherein the control program checks an address registration in the storage when the facsimile machine requests for a facsimile data transmission, wherein the switching unit connects to the computer interface in case that the address is already registered, and wherein, in case that the address is not registered, the control program controls to receive an address transmitted via the public switched telephone network after the facsimile data transmission.

2. The line-switching facsimile modem as defined in claim 1, wherein the control program controls to transmit the line-switching facsimile modem's address after the facsimile data transmission via the public switched telephone network.

3. The, line-switching facsimile modem as defined in claim 1, wherein the control program controls to transfer the address received via the public switched telephone network.

4. The line-switching facsimile modem as defined in claim 1, wherein the computer interface is connected to the Internet via a computer.

5. The line-switching facsimile modem as defined in claim 1, wherein the address is an IP address and wherein the control program controls to receive the IP address transmitted via the public switched telephone network.

6. The line-switching facsimile modem as defined in claim 1, wherein the address is an email address and wherein the control program controls to receive the e-mail address transmitted via the public switched telephone network.

7. The line-switching facsimile modem as defined in claim 1, wherein the computer interface is a serial interface.

8. The line-switching facsimile modem as defined in claim 1, wherein the computer interface is connected to an inner data bus.

9. A facsimile modem connection method for transmitting and receiving a facsimile data from a facsimile machine using a facsimile modem that includes a computer interface, a storage for registering an address, a control program stored in the storage, and a switching unit for performing a switching operation between a public switched telephone network connect line and the computer interface controlled by the control program; the facsimile modem connection method comprising:

checking whether an address is registered in the storage when the facsimile machine requests for the facsimile data transmission;

transmitting the facsimile data via the computer interface in case that the address is already registered; and receiving an address transmitted via the public switched telephone network in case that the address is not registered.

10. The facsimile modem connection method as defined in claim 9, further comprising:

transmitting the facsimile modem's address via the public switched telephone network in case that the address is lacking.

11. The facsimile modem connection method as defined in claim 9, further comprising:

transferring the address received by the computer interface.

12. The facsimile modem connection method as defined in claim 9, further comprising registering the address received to the storage, in case that a registration is instructed by a host computer.

13. The facsimile modem connection method as defined in claim 9, further comprising:

checking whether an instruction is being made from a host computer to transmit the facsimile data via the computer interface; and transmitting the facsimile data via the public switched telephone network, in case the instruction is lacking.

14. A line-switching facsimile modem, comprising:

a computer interface;

a switching unit operably connected to the computer interface, said switching unit performing a switching operation between a public switched telephone network connect line and the computer interface;

a controller operably connected to the switching unit;

a storage device operably connected to the controller, said storage device registering an address;

wherein said controller checks an address registration in said storage device when a facsimile machine requests for a facsimile data transmission, wherein the switching unit connects to the computer interface in case that the address is already registered, and wherein the controller controls to receive an address transmitted via the public switched telephone network after the facsimile data transmission via the public switched telephone network, in case that the address is not registered.

* * * * *